United States Patent
Leibacher et al.

[11] Patent Number: 6,156,277
[45] Date of Patent: Dec. 5, 2000

[54] EXHAUST GAS CLEANING PLANT FOR A CEMENT ROTARY KILN

[75] Inventors: Ulrich Leibacher, Hinwil; Walter Eckert, Schwerzenbach, both of Switzerland

[73] Assignee: Elex AG, Schwerzenbach, Switzerland

[21] Appl. No.: 09/029,502

[22] PCT Filed: Jul. 24, 1996

[86] PCT No.: PCT/CH96/00266

§ 371 Date: Feb. 27, 1998

§ 102(e) Date: Feb. 27, 1998

[87] PCT Pub. No.: WO97/09112

PCT Pub. Date: Mar. 13, 1997

[30] Foreign Application Priority Data

Sep. 8, 1995 [CH] Switzerland ............................. 2555/95

[51] Int. Cl.[7] .................................................. B01D 53/86
[52] U.S. Cl. ......................... 422/168; 422/171; 422/172; 422/177; 422/180
[58] Field of Search ..................... 422/171, 172, 422/177, 180, 211, 222, 168; 50/523, DIG. 30

[56] References Cited

U.S. PATENT DOCUMENTS

| | | |
|---|---|---|
| 4,072,471 | 2/1978 | Morgan, Jr. et al. ..................... 422/180 |
| 4,285,838 | 8/1981 | Ishida et al. ........................... 423/213.2 |
| 4,294,806 | 10/1981 | Abe et al. ................................ 422/180 |
| 4,307,068 | 12/1981 | Matsumoto et al. ..................... 422/180 |
| 4,721,699 | 1/1988 | Wagener et al. ......................... 423/239 |
| 4,764,348 | 8/1988 | Furlong .................................... 422/178 |
| 5,264,013 | 11/1993 | Brentrup .................................... 95/128 |
| 5,283,052 | 2/1994 | Hums ....................................... 422/177 |
| 5,350,566 | 9/1994 | Stringaro ................................. 422/191 |

*Primary Examiner*—Hien Tran
*Attorney, Agent, or Firm*—Bachman & LaPointe, P.C.

[57] ABSTRACT

The installation (10) proposed in intended for the cleaning of flue gases from an oven (12), particularly a revolving cylindrical cement kiln. It includes at least one reduction catalyst (14) for gaseous pollutants and a dust collector. The reduction catalyst (14), together with a reagent-injection point on the input side of the catalyst, is located immediately after the oven (12), i.e. before the dust collector. In preferred embodiments, the reduction catalyst (14) has a basic honeycomb structure with wide gas-circulation channels (66) and/or the honeycombs are screened off upstream by at least one screen. Gaseous pollutants removed by the system are, in particular, $NO_x$, CO and hydrocarbons.

11 Claims, 3 Drawing Sheets

EXHAUST GAS CLEANING PLANT FOR A CEMENT ROTARY KILN

BACKGROUND OF THE INVENTION

The invention relates to a plant for cleaning the exhaust gases from a cement rotary kiln, which comprises at least one reduction catalyst with a honeycomb-shaped basic pattern for gaseous pollutant components and a dust separator.

Industrial furnace plants which are used in the cement industry always constitute a specific problem with regard to gas cleaning. As well as the high exhaust gas temperature of for example 250–400° C., the dust structure influenced by the construction of the heat exchanger and the cyclic processes performed is problematical. Exhaust gases are produced which contain dust and gaseous components. The solid components have been precipitated with increasing efficiency for decades. In relation to the gaseous constituents, the exhaust gas cleaning has only recently achieved a state which can be regarded as environmentally tolerable. During combustion, in addition to CO and hydrocarbons, in particular nitrous oxide compounds known as $NO_x$ are produced which must also be removed. Under particular peripheral conditions, in particular in strong sunlight and with a high concentration of hydrocarbon compounds in the environment, within hours an ozone excess attributable to a nitrous oxide content can be generated which exceeds the tolerance limits. The nitrous oxides also contribute to the formation of acid in the atmosphere because part of the $NO_2$ is transferred into nitrous acids.

One technically perfected process available is catalytic denitrification, in particular with a selective reduction catalyst (SCR). Here in the state of the art for example ammonia is injected into the exhaust gas flow which causes the nitrous oxide contained in the exhaust gas to be converted into nitrogen and water on the catalyst surface.

EP, A1 0519225 describes an industrial furnace plant with a first filter stage for removal of dust from the exhaust gases to be cleaned. In at least one further filter stage, the exhaust gases cleared of dust are cleaned of the $NH_x$ compounds and/or volatile pollutant elements and compounds contained by at least partial $NO_x$ reduction with the use of a carbon-containing filter medium. The filter dust precipitated in the first filter stage is processed and passed for recycling.

DE, A1 3601917 describes a process for cleaning exhaust gas, in particular the exhaust gases from waste combustion plants, of nitrous and sulphur oxides, hydrocarbons, dioxins and dust. The exhaust gases from the combustion plant are passed via a secondary burning chamber with a primary and secondary dust filter to a DENOX catalyst, a first reduction catalyst, in which the nitrous oxides and where applicable sulphur oxides are reduced to elementary nitrogen or sulphur. In a chain of further assemblies, the cleaned exhaust gas is passed to a stack.

Dust separators structured as electric filters are described for example in the journal Zement-Kalk-Gips (ZKG International) Vol 35 (1982) Ed. 10, pages 509 to 518. The emphasis is placed on dust removal, in particular conditioning of the dust particles with water before introduction to an electric filter. Instead of an electric filter, for dust removal also filtering precipitators, for example hose filters, can be used. The exhaust gas cleaned of dust can then be passed to at least one reduction catalyst for removal of the gaseous pollutants.

The present invention is based on the task of creating a plant to clean the exhaust gases of a cement rotary kiln of the type described initially which can be used in particular in the cement industry with a high degree of efficiency of the catalyst, which works practically maintenance-free and which eliminates the pollutants in one working process without the production of residual substances. Special and further design forms of the invention are the object of the dependent patent claims.

SUMMARY OF THE INVENTION

The task is solved by the invention in that the reduction catalyst with its reaction agent injection on the inlet side has enlarged flow channels with linear dimensions of at least 5 mm and is arranged immediately after the cement rotary kiln, ie. before dust removal.

According to other known design forms of a exhaust gas cleaning plant with a cement rotary kiln according to the present invention, the untreated gas is first cleaned of dust and only then passed to a reduction catalyst. This reduces for example nitrous oxide compounds, CO and hydrocarbons.

In industrial practice, in addition to the reduction catalyst and the dust separator preferably formed as an electric filter or hose filter, suitably further assemblies are incorporated:

In an evaporative cooler of known type, the dust-like particles are conditioned and cooled with water so that optimum precipitation conditions occur in the dust separator, or if a hose filter is used the maximum temperature to be observed for the filter material is not exceeded. In a plant designed for the cement industry, the exhaust gas flow leaving the reduction catalyst is passed at least partially via a raw meal mill.

Furthermore an oxidation catalyst of known type can also be used.

The clean gas leaving the electric filter is emitted as usual via a stack or similar into the atmosphere.

As stated however only the arrangement of the reduction catalyst immediately next to the cement rotary kiln is essential to the invention.

The reduction catalyst is of honeycomb pattern. It has longitudinal flow channels formed by partition walls, where the said channels are for example of square, rectangular, round, triangular or hexagonal cross section. The cross section forms can be as preferred but are suitably regular. Known reduction catalysts have flow channels with a minimum linear dimension of 3 to 4 mm. The linear dimension for example in square and rectangular forms is the side lengths, in round cross sections the diameter and in hexagonal cross sections the distance between the side surfaces.

According to the invention, the minimum linear dimensions of the duct cross sections are at least 5 mm, preferably at least 10 mm, in particular 15 to 20 mm. The wall thicknesses are formed according to the mechanical requirements and are one or several millimeters.

In industrial practice, the reduction catalyst or the catalyst carrier are suitably modular in construction. This allows simple assembly and easy replacement of any faulty catalyst parts.

For preference the reduction catalyst comprises not only a single but several honeycomb layers arranged in succession, in particular three to five. These suitably do not lie immediately against each other but are arranged at intervals so that the exhaust gas can mix again. The intervening space can for example correspond approximately to the length of the flow channels in the honeycombs. Depending on the pollutant components to be reduced, the honeycomb layers consist of the same or different catalyst materials.

The catalyst carrier preferably consists of at least superficially porous catalyst material. A catalytically active material is integrated into the open pores and/or micropores and essentially reduces the reaction temperature and thus accelerates the process.

In the known manner, the catalytically active material of the reduction catalyst preferably consists of active metal oxides which act by selective reduction. Titanium dioxide ($TiO_2$) has proved particularly suitable as a ceramic carrier material with vanadium pentoxide ($V_2O_5$) as the active main component which can contain further components for example tungsten oxide. Further catalytically active substances are based for example on iron oxide mixed with further metal oxides.

In known plants of this type it is usual to pass the exhaust gases, at least partly cleaned of dust, into the flow channels of the reduction catalyst horizontally or from the top. In particular with the approximately vertical introduction from the top, wedge-shaped dust deposits form on the separating walls of the catalyst which are carried away by the exhaust air flow in pulses and can thus lead to clogging in the catalyst.

In a particularly advantageous design form of the invention, the flow channels of the reduction catalyst are arranged steeply angled or vertical, where means are provided which guide the flow in from below. These means can for example be deflector plates. The reduction catalyst is preferably arranged immediately next to the cement rotary kiln with a deflector and an approximately vertical intake pipe.

According to this preferred design form, no dust wedges or similar can be deposited and carried in pulses, and the dust load remains evenly distributed.

Only low quantities of dust are deposited on the walls of the flow channels in the honeycomb of the reduction catalyst. These deposits are preferably blown out regularly by compressed air cleaning and lead to no effects disrupting the catalyst in its normal operation. Depending on the size of the plant and the dust load, compressed air can be applied manually or via program-controlled moving nozzle rails or similar. The flow channels of the reduction catalyst, if they do not run in the preferred approximately vertical direction, are angled up to maximum approximately 45° for optimum operation (See angle α in FIGS. 3 and 5.).

In a further design form of the invention, the wall cross sections of the honeycomb of the reduction catalyst are screened upstream by at least one template with approximately similar coverage.

This template preferably does not lie directly on the impact-sensitive honeycomb structure but at a slight distance from this. The template consists of an impact- and temperature-resistant material which is also corrosion-resistant. Dust precipitation or the formation of the said wedges can be prevented as the template is regularly tapped, shaken or vibrated. This is done manually or by arranging a corresponding, preferably program-controlled mechanism.

In a first variant, a single template is placed at a slight distance from the honeycomb, for example a few millimeters. In further variants several templates are arranged at distances of several centimeters or decimeters, and can also be offset in relation to the flow openings.

The screening templates preferably consist of a corrosion-resistant metal plate perforated according to the honeycomb structure. Plastic plates cannot usually meet the requirements for temperature resistance.

The perforations in the templates in particular correspond suitably to the honeycomb structure with regard to the pattern, but can also deviate from this.

With the arrangement according to the invention of the reduction catalyst immediately after a cement rotary kiln, thanks to the high exhaust gas temperature in the range from 250 to 400° C., this can be operated safely. The exhaust gas temperature is optimum for catalytic denitrification without the use of external energy. The sulphur compounds present in the exhaust gas however do not react in this temperature range, which prevents clogging in the catalyst and deterioration of subsequent devices in the exhaust gas path.

The advantages concerning the upstream template or templates, the enlarged cross section of the flow channel of the honeycombs and/or the inlet into the reduction channel from below also occur in plants with other than cement rotary kilns, for example furnaces for the disposal of domestic and industrial refuse of all types.

BRIEF DESCRIPTION OF THE DRAWINGS

The invention is explained in more detail with reference to the design examples shown in the drawing which are also the subject of the dependent patent claims. The drawings show:

DETAILED DESCRIPTION OF PREFERRED EMBODIMENTS

Figure 1:
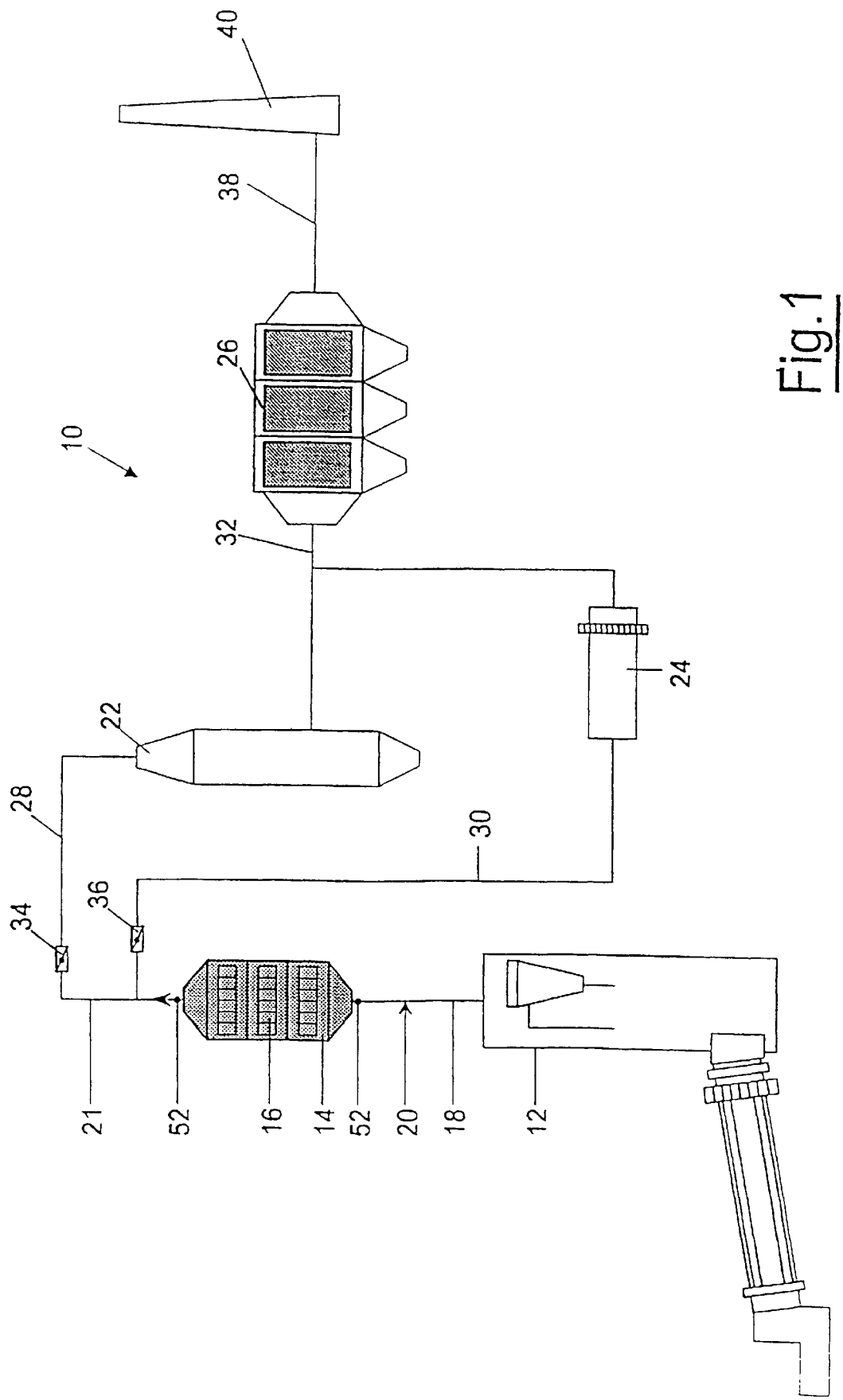
FIG. 1 a plant for cleaning the exhaust gas of a cement rotary kiln

A plant 10 shown in FIG. 1 is used to clean the exhaust gases from a cement rotary kiln 12 with heat exchanger. Immediately after the cement rotary kiln 12 is arranged a reduction catalyst 14 which comprises three catalytically active layers 16 of modular structure. Two identical layers are used to reduce the $NO_x$, the different third layer reduces the CO and hydrocarbons. All three layers consist of catalyst materials known in themselves. Into the connecting pipe 18 from cement rotary kiln 12 to reduction catalyst 14, also called the exhaust gas pipe, opens a reduction agent line 20 through which for example ammonia or urea is injected. To this end are inserted in connecting pipe 18 nozzle lances, not shown, which evenly and finely distribute the reduction agent in the exhaust gas flow. The reduction catalyst 14 is suitably arranged not as drawn above, but next to cement rotary kiln 12. The exhaust gas is then, as shown in FIG. 1, passed from beneath into the reduction catalyst 14.

Line 21 connected after the catalyst 14 branches into a line 28 for direct operation via an evaporative cooling tower 22 and a line 30 for mill operation by means of a raw meal mill 24. Before the dust separator 26, in the present case an electric filter, the two lines 28, 30 combine again into a common line 32. Direct operation and/or mill operation are regulated in the known manner by two adjustment flaps 34, 36. A clean gas line 38 leads to a stack 40.

A measurement sensor 52 for $NO_x$ concentration is arranged in each of the supply and extraction flow nozzles of the reduction catalyst 14. These sensors control, via electronics which are not shown, a metering pump for the reduction agent stored in a tank, in the present case a 25% aqueous ammonia solution which is injected via the reduction agent line 20.

Figure 2:
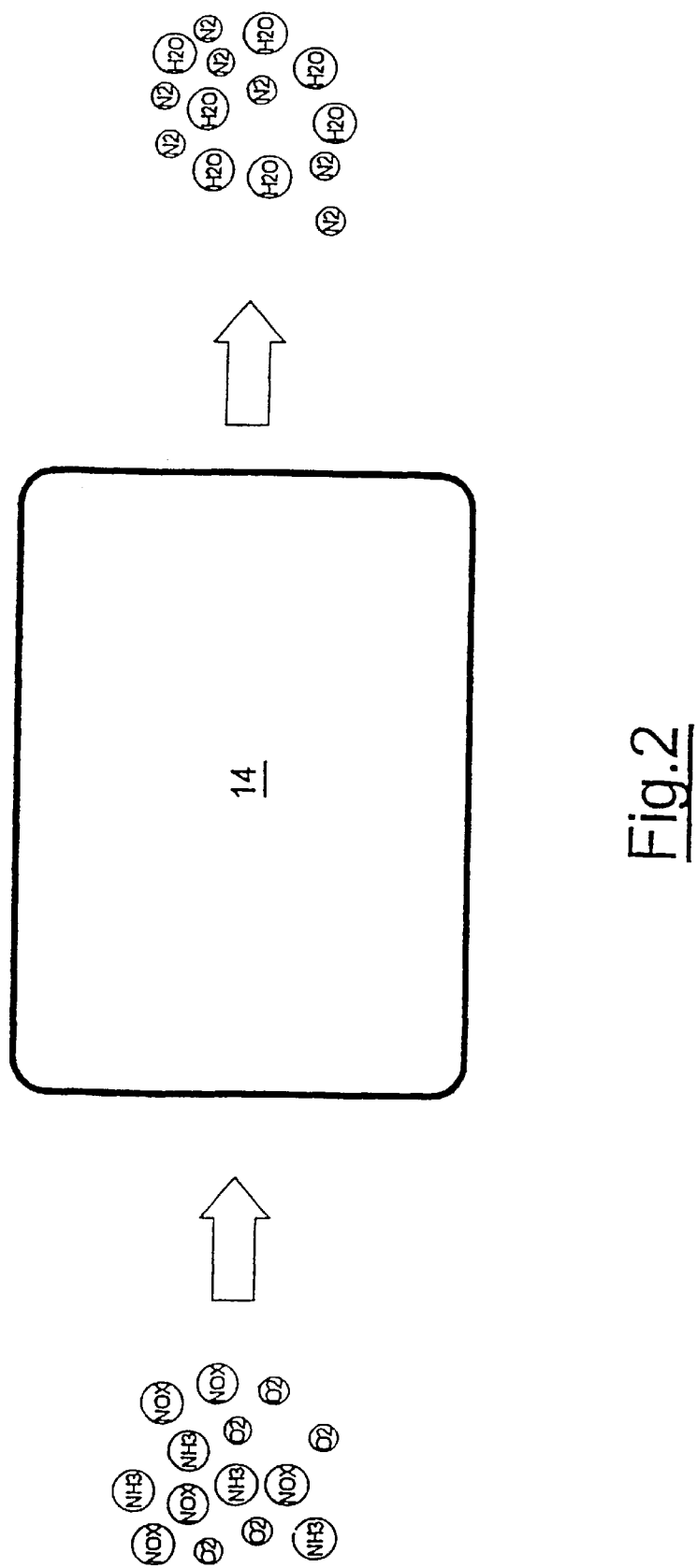
FIG. 2 a diagram of the denitrification reaction

FIG. 2 shows diagrammatically the denitrification of the nitrous gases $NO_x$ in a reduction catalyst 14.

The nitrous oxide contained in the exhaust gas is reduced in the SCR process (selective catalytic reaction) using ammonia. This produces nitrogen and water. No other substances or residues are produced. The chemical reactions occurring are shown in the formulae below:

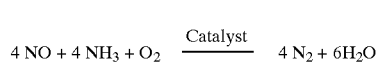

(1)

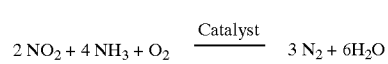

(2)

The exhaust gases from a cement rotary kiln are denitrified mainly according to formula 1, as the exhaust gases contain mainly NO and not $NO_2$.

Figure 3:
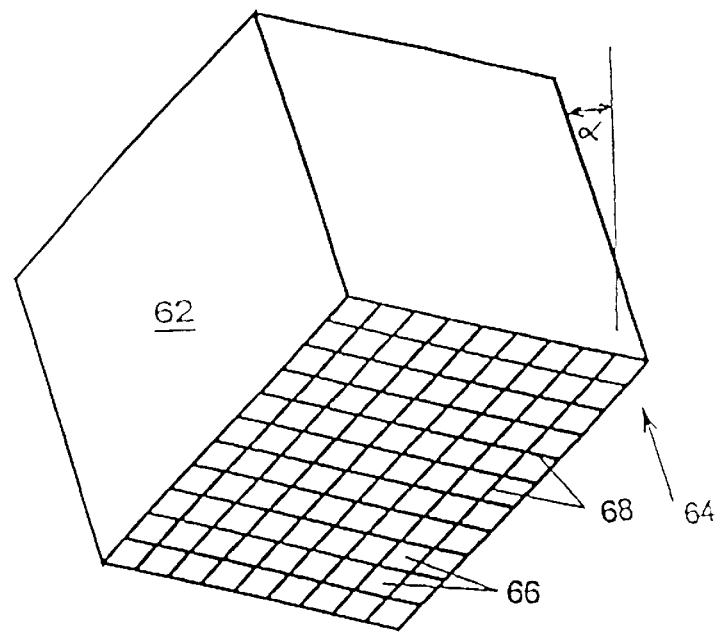
FIG. 3 a module of a honeycomb catalyst

A honeycomb catalyst 62 or a module thereof for performing reactions (1) and (2) is shown in perspective in FIG. 3. This has flow channels 66 of square cross section running in the direction of arrow 64. The outer and partition walls 68 consist of ceramic material which is formed microporous on at least surface 70 (FIGS. 4, 5).

The modular honeycomb catalysts 62 can be laid with their side surfaces against and/or behind each other until the necessary dimensions are achieved. Using sealing agents known in themselves, slippages are avoided or at least greatly reduced.

Figure 4:
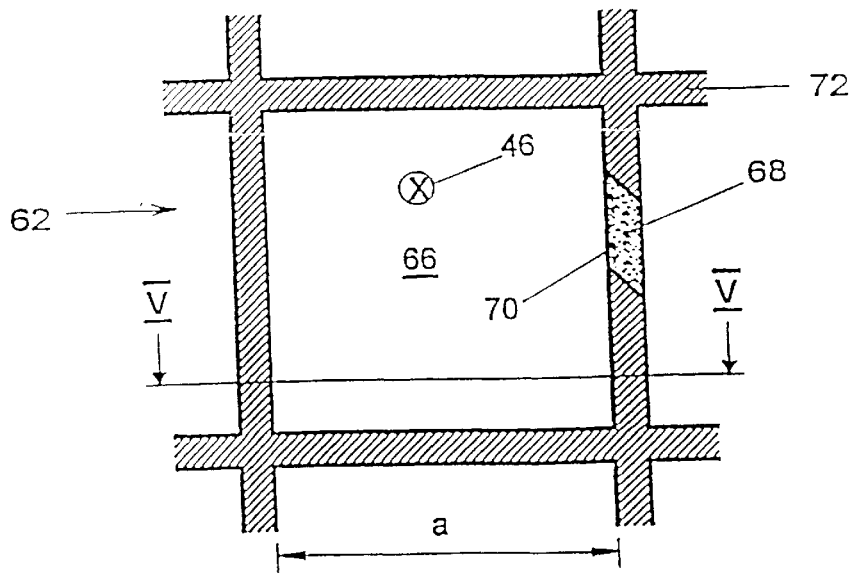
FIG. 4 an enlarged view of a flue channel of the honeycomb channel in FIG. 3 covered with a template, and FIG. 5 a cross-sectional view along line V—V in FIG. 4.
Figure 5:
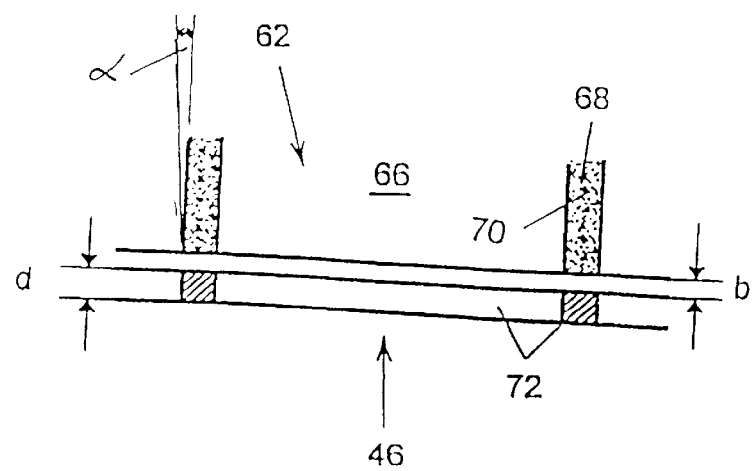

FIG. 4 shows a view of an internal flow channel 66 with the adjacent part of the neighbouring channels. The exhaust gas 46 flows towards the back in the direction shown. The linear dimensions of the cross section of the flow channel are marked a. In the present case of a square pattern, the two characteristic linear dimensions a are the same.

Upstream in relation to the exhaust gas 46 is arranged a template 72 of a metal sheet at a distance above the honeycomb catalyst 62 (FIG. 3). Square holes which correspond approximately to the cross section of the flow channels 66 have been punched out of the sheet. This template 72 is impact-resistant and can be tapped, shaken or vibrated. The honeycomb catalyst 62 of ceramic material lying underneath would not tolerate these movements in long-term use and would quickly crumble away.

FIG. 5 shows that the template 72 of thickness d has a spacing b from honeycomb catalyst. For example thickness d is approx 2 mm and distance b approx 5 mm. In industrial practice the template 72 consists of several layers of punched sheet strips, the resulting free cross section of which corresponds at most approximately to the catalyst pitch. Distance b in this case is 10 to 100 cm.

Example for Operation of a Plant

The exhaust gas 46 containing nitrous oxides is subjected to SCR cleaning with injected ammonia and passed into a reduction catalyst 14. This produces nitrogen and water. No other oxides or residues are produced. The chemical reactions occurring (1) and (2) are shown and described in FIG. 2.

After being introduced into the reduction catalyst 14 with honeycombs 62, in a first stage ammonia is stored in the micropores of the catalyst surface 70. The $NO_x$ present in the exhaust gas 46 immediately reacts with the stored ammonia in the micropores. The catalyst causes the reaction to begin from 200° C. Without the catalyst the reaction would begin only from around 650° C. The reduction catalyst 14 itself consists of ceramic $TiO_2$ as the carrier material and $V_2O_5$ as a reactive metal oxide.

In establishing a lower limit for the working temperature of the catalyst, it has been found that as the temperature reduces, more ammonium-sulphur and ammonium-chlorine compounds are formed which reduce the activity of the catalyst. Examples of such compounds are ammonium sulphate, ammonium hydrogen sulphate and ammonium chloride. For these reasons the lower limit for injection of ammonia is around 250° C.

The quantity of ammonia necessary for reduction is determined on the basis of the $NO_x$ quantity measured in the untreated and clean gas and injected via line 20 into the exhaust gas flow. The reduction catalyst 14 has a natural storage capacity for the ammonia so that the $NO_x$ fluctuations in the untreated gas can be absorbed.

The ammonia required for the catalytic denitrification is for safety reasons stored as ammonia/water solution (=ammonium hydroxide) in storage tanks fitted with corresponding safety devices. The mixture is vaporised either in a separate vaporizer before injection into the exhaust gas flow or after injection in the exhaust gas flow itself.

The reduction agent is injected via several nozzle lances or rails which are incorporated in the connecting pipe 18 of the cement rotary kiln 12 and the reduction catalyst 14. The resulting nozzle grid guarantees an even injection of the reduction agent. The exhaust gas with the injected reduction agent can then be passed over mixing devices to ensure a homogeneous mixture.

The exhaust gas cleaning plant according to the invention can, in performance of the task, eliminate pollutants economically and technically efficiently without the occurrence of residual substances and can be used particularly advantageously in the cement industry and related industries.

What is claimed is:

1. A plant for cleaning exhaust gases comprises:
a cement rotary kiln having a heat exchanger, the rotary kiln having an outlet for discharging exhaust gases; a reduction catalyst arranged above the cement rotary kiln for receiving the discharged exhaust gases directly from the outlet of the cement rotary kiln, the reduction catalyst comprises a honeycomb shaped structure having internal flow channels characterized by linear dimensions (a) of channel cross section of at least 10 mm; and means for passing the exhaust gases directly from the rotary kiln to the reduction catalyst in a substantially vertical direction, wherein the internal flow channels are arranged at an angle α with respect to the vertical direction where α is between 0° to about 45°.

2. A plant according to claim 1, wherein the linear dimensions (a) is between about 10–20 mm.

3. A plant according to claim 1, wherein the honeycomb shaped structure comprises at least one modular structure catalytic layer of honeycomb-shaped ceramic material.

4. A plant according to claim 3, wherein the honeycomb shaped structure comprises a plurality of layers arranged in series.

5. A plant according to claim 4, wherein the honeycomb shaped structure has at least one layer for reduction of $NO_x$ and at least one layer for reduction of CO and hydrocarbons.

6. A plant according to claim 3, wherein the ceramic material comprises a microporous structure with an integral catalytically active material.

7. A plant according to claim 1, wherein the flow channels include a catalytically active material to reduce $NO_x$ and consists of active metal oxides.

8. A plant according to claim 7, wherein the catalytically active material is vanadium pentoxide.

9. A plant according to claim 1, wherein the flow channels of the reduction catalyst are angled at approximately 0° to the vertical direction.

10. A plant according to claim 1, wherein the honeycomb shaped structure includes at least one template upstream thereof.

11. A plant according to claim 10, wherein the template is spaced from the honeycomb shaped structure.

* * * * *